Nov. 4, 1930.  C. A. SNOW, JR  1,780,369
METHOD OF DETERMINING DRIFT OF AIRCRAFT
Filed Feb. 16, 1929
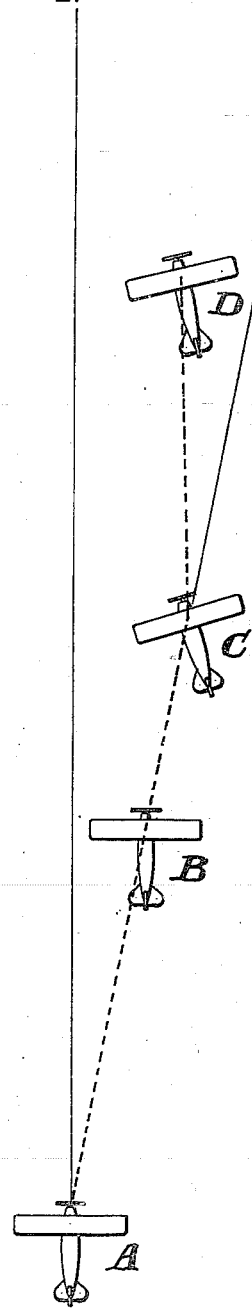
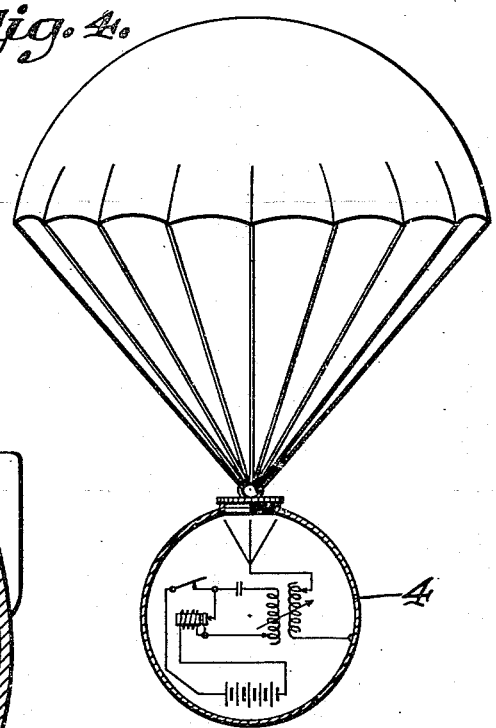
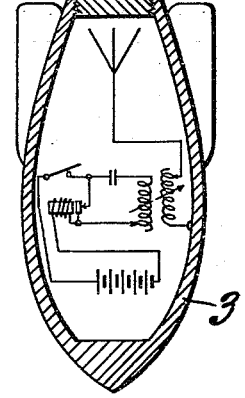
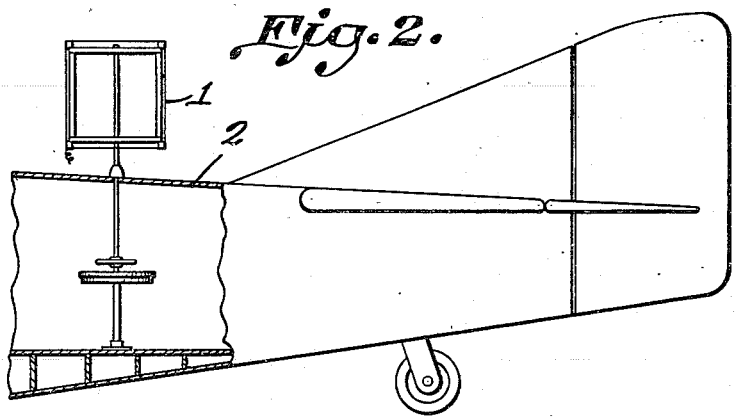
Chester A. Snow, Jr. Inventor
By C. A. Snow & Co.
Attorneys.

Patented Nov. 4, 1930

1,780,369

UNITED STATES PATENT OFFICE

CHESTER AMMEN SNOW, JR., OF WASHINGTON, DISTRICT OF COLUMBIA

METHOD OF DETERMINING DRIFT OF AIRCRAFT

Application filed February 16, 1929. Serial No. 340,635.

This invention relates to a new and improved method whereby the drift of aircraft can be determined accurately, thereby to enable the navigator readily to maintain the proper course.

Heretofore it has been the practice to drop smoke bombs or flares and to determine from the angular positions thereof the proper heading on which the aircraft should travel in order to compensate for side drift. While this procedure has been efficient under certain climatic conditions, it has not been practical where the aircraft is travelling at a high altitude and over cloud formations or where the visibility is poor from any cause.

It is an object of the present invention to provide a method of determining side drift which can be used efficiently under all conditions and with this and other objects in view, the invention consists of certain novel steps of the method hereinafter more fully described and pointed out in the claims, it being understood that various changes may be made within the scope of the claims without departing from the spirit of the invention.

In the accompanying drawing the apparatus used in carrying out the method has been illustrated in a general way.

In said drawing,

Figure 1 is a diagram showing an airplane in flight, different positions thereof, during and after the determination of side drift, being indicated.

Figure 2 is a view of a portion of an airplane showing one form of direction finder.

Figure 3 is a view of one type of wave generating element used in carrying out the method.

Figure 4 is a view of another type of wave generating element.

In carrying out the method two essential units are employed, namely, a wave direction finder utilizing a loop 1, this finder being part of the equipment of the aircraft 2, and a wave generating unit which can be of the bomb type as illustrated in Figure 3 or of the parachute type as indicated in Figure 4. In each type there is included in a housing all necessary equipment for producing a signal and if the unit is of the bomb type the housing 3 is so constructed that, when it is dropped from an aircraft, it will strike the surface of a body of water without shattering the wave generating equipment. This type can also be made to float on the surface of the body of water. If a parachute type of unit is employed the housing 4 thereof will properly protect the apparatus contained therein so that it will not become injured when contact is made with the ground.

Referring to Figure 1 of the drawing an airplane has been indicated at A on a true north heading at the start of a flight to a destination true north. In the present instance the airplane is equipped with the radio direction finder herein described and with one or more broadcasting units of either or both of the types illustrated.

For the purpose of illustration it can be assumed that the speed of the aircraft is one hundred fifty miles per hour and that there is a direct west cross wind of thirty miles per hour. This will produce a decided drift. When the navigator reaches, for example, the point B and then desires to determine the drift angle, one of the broadcasting units is released after the broadcasting apparatus has begun to function. Thereafter the navigator, by the use of the radio direction finder can determine readily the drift angle B A N and, as shown as C, can correct the airplane heading so as to compensate for the drift and fly the course C D true north to the desired destination.

No claim is made for the particular construction of either the direction finder or the wave producing units. It is merely essential that these wave producing units be contained in strong, shock-resisting, waterproof shells or housings and that they be short lived and of high intensity, operating continuously and automatically.

It is not intended to restrict the method to the use of any particular type of wave producing and receiving means as waves other than those used in radio transmission might be employed.

What is claimed is:

1. The method of determining the drift angle of an aircraft which includes the steps of delivering a radio broadcasting unit from the aircraft while in flight and thereafter picking up signals from said unit through a radio direction finder.

2. The method of determining the drift angle of an aircraft which includes the steps of casting off from the aircraft while in flight a continuously operating automatic radio signal broadcasting unit, and subsequently picking up the signal with a radio direction finder.

3. The method of determining the drift angle of an aircraft which includes the steps of delivering a wave broadcasting unit from the aircraft while in flight and thereafter picking up signals from said unit through a direction finder.

In testimony that I claim the foregoing as my own, I have hereto affixed my signature.

CHESTER AMMEN SNOW, Jr.